(12) United States Patent
Rajkumar et al.

(10) Patent No.: US 11,224,806 B2
(45) Date of Patent: Jan. 18, 2022

(54) SYSTEM ASSISTED REPLAY OF EXCEPTIONAL GAME EVENTS IN A VIDEO GAME

(71) Applicant: Sony Interactive Entertainment Inc., Tokyo (JP)

(72) Inventors: Nirmal Rajkumar, Redwood City, CA (US); Jeff Stafford, Redwood City, CA (US); Justice Adams, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/907,002

(22) Filed: Jun. 19, 2020

(65) Prior Publication Data
US 2021/0394059 A1 Dec. 23, 2021

(51) Int. Cl.
*A63F 13/497* (2014.01)
(52) U.S. Cl.
CPC .................. *A63F 13/497* (2014.09)
(58) Field of Classification Search
CPC .................................................. A63F 13/497
See application file for complete search history.

(56) References Cited

U.S. PATENT DOCUMENTS

| | | | |
|---|---|---|---|
| 7,632,186 B2 * | 12/2009 | Spanton | A63F 13/12 463/40 |
| 9,403,090 B2 * | 8/2016 | Harris | A63F 13/537 |
| 9,873,056 B2 * | 1/2018 | Navok | A63F 13/86 |
| 10,460,557 B2 * | 10/2019 | Alderucci | G06F 21/10 |
| 10,460,566 B2 * | 10/2019 | Amaitis | G06F 17/40 |
| 2005/0255914 A1 * | 11/2005 | McHale | A63F 13/10 463/31 |

(Continued)

FOREIGN PATENT DOCUMENTS

| | | |
|---|---|---|
| EP | 3662981 A2 | 6/2020 |
| WO | 2020/068220 A1 | 4/2020 |

OTHER PUBLICATIONS

PCT Notification of Transmittal of the International Search Report and the Written Opinion of the International Searching Authority, issued in corresponding International Patent Application No. PCT/US2021/037225, dated Sep. 27, 2021 (14 total pages).

*Primary Examiner* — Reginald A Renwick
(74) *Attorney, Agent, or Firm* — Penilla IP, APC

(57) ABSTRACT

A method for identifying game events includes providing a spectator channel for a video game, detecting a tag selection in the game while it is being played, and identifying a screen location associated with the tag selection. The method includes examining the screen location to identify game action occurring proximate to the tag selection, and accessing a recording of the game including the game action. The recording includes a plurality of frames associated with state data and metadata, and the method includes examining this data to quantify the recording. The examining assigns a significance value using the state data and metadata. A video clip from the recording associated with the tag selection is stored when the significance value exceeds a predefined threshold. The video clip is viewable (watch mode) and playable (play mode), which uses state data to execute a portion of the game that relates to the clip.

24 Claims, 11 Drawing Sheets

(56) References Cited

U.S. PATENT DOCUMENTS

| | | | |
|---|---|---|---|
| 2007/0087799 A1* | 4/2007 | Van Luchene | A63F 13/792 463/1 |
| 2007/0123327 A1* | 5/2007 | Van Luchene | A63F 13/60 463/1 |
| 2008/0119286 A1* | 5/2008 | Brunstetter | A63F 13/00 463/43 |
| 2009/0104956 A1* | 4/2009 | Kay | A63F 13/814 463/7 |
| 2010/0023966 A1* | 1/2010 | Shahraray | H04N 21/47 725/34 |
| 2011/0281648 A1 | 11/2011 | Weising | |
| 2012/0238350 A1* | 9/2012 | Sarig | A63F 13/10 463/25 |
| 2014/0011586 A1* | 1/2014 | Vorster | G06Q 50/01 463/31 |
| 2014/0179424 A1 | 6/2014 | Perry et al. | |
| 2017/0065889 A1* | 3/2017 | Cheng | A63F 13/497 |
| 2017/0157512 A1 | 6/2017 | Long et al. | |
| 2019/0099675 A1* | 4/2019 | Khan | A63F 13/212 |

* cited by examiner

| SIGNIFICANCE VALUE | TOTAL CLIP LENGTH (seconds) | TIME BEFORE TAG (seconds) | TIME AFTER TAG (seconds) |
|---|---|---|---|
| 3 | 12 | 5 | 7 |
| 6 | 15 | 6 | 9 |
| 9 | 20 | 8 | 12 |

SYSTEM ASSISTED REPLAY OF EXCEPTIONAL GAME EVENTS IN A VIDEO GAME

BACKGROUND

As the popularity of gaming has increased, more and more spectators are streaming live and recorded video games and electronic sports ("esports") events. Some spectators stream video games and esports events simply because they enjoy watching highly skilled players in action, while other spectators watch because they want to learn game moves from highly skilled players to improve their level of play.

In light of the impact spectators can have on the popularity of a video game or esports event, game developers have sought to enhance the viewing experience by providing increased functionality and interactivity for spectators. To date, however, it is difficult for spectators to identify interesting game events that they see so that they can go back and watch these game events again because they have to scrub through an entire recording of the video game or esports event to find these game events.

It is in this context that embodiments arise.

SUMMARY

In an example embodiment, a method for identifying game events includes providing a channel for a spectator to view a video game being played by a player. The method also includes detecting a tag selection in a scene of the video game while the video game is being played by the player, and identifying a screen location that is associated with the tag selection. The method further includes examining the screen location to identify a game action occurring proximate to the tag selection, and accessing a recording of the video game that includes the game action. The recording includes a plurality of frames, and the plurality of frames is associated with state data generated when the video game was played by the player and metadata descriptive of progress of the video game by the player. Still further, the method includes examining the state data and the metadata to quantify the recording. The examining is configured to assign a significance value to the recording, and the significance value is calculated from a combination of the state data and the metadata. The method also includes storing a video clip from the recording associated with the tag selection when the significance value exceeds a predefined significance threshold. The video clip is made accessible for viewing in a watch mode and playable in a play mode, and the play mode uses the state data to execute a portion of the video game that relates to the video clip.

In one embodiment, the screen location for the tag selection is used to exclude any game action with a weighting value below a weighting threshold. In one embodiment, the state data is configured to generate contextual features occurring in the scene and the metadata is configured to identify success features in the video game for the player. In one embodiment, the contextual features and the success features are processed by one or more classifiers to generate classification data that is processed by a significance model, where the significance model is configured to produce the significance value for the recording.

In one embodiment, the video clip includes a plurality of frames before the detecting of the tag selection and a plurality of frames after the detecting of the tag selection. In one embodiment, the length of the video clip is based on the significance value of the recording such that the length of a video clip related to a relatively high significance value is greater than the length of a video clip related to a relatively low significance value.

In one embodiment, feedback is received from one or more viewers of the recording to determine an accuracy of the significance value of the recording. In one embodiment, the viewers of the recording include one or more of a player, a spectator, and a game developer.

In one embodiment, the examining of the screen location to identify a game action occurring proximate to the tag selection includes defining a plurality of weighting regions around the screen location, with each of the plurality of weighting regions having an assigned weighting value, and determining whether a game action is occurring within each of the plurality of weighting regions. In one embodiment, the plurality of weighting regions includes a plurality of concentric circles, with the plurality of concentric circles having the screen location as a common center.

In one embodiment, the method further includes receiving a request from a user to view the video clip in the watch mode, and causing the video clip to be streamed to the user for viewing. In one embodiment, the method further includes receiving a request from a user to play the video clip in the play mode, transmitting game code and the state data to enable play of a portion of the video game that corresponds to the video clip in the play mode, wherein a play execution engine executes the game code using the state data, and causing the portion of the video game to be streamed to the user so that the user can interactively play the portion of the video game in the play mode.

In one embodiment, the method further includes, during play of the portion of the video game in the play mode, receiving a request from the user for assistance with a game action, substituting the player for the user during a segment of the portion of the video game being played in play mode, and, upon completion of the segment, substituting back the user for the player to complete the portion of the video game being played in play mode.

In one embodiment, the method further includes causing a previously published video feed of the player playing the segment of the portion of the video game being played in play mode to be streamed to the user for viewing, with the previously published video feed of the player having been published when the player originally played the segment of the portion of the video game being played in play mode.

In one embodiment, the method further includes, during play of the portion of the video game in the play mode, receiving a request from the user for expert assistance with a game action, determining a context for the game action, where the determining includes extracting features of a scene in which the game action occurs and processing the features with one or more classifiers to generate classification data for the game action, using an expert model to process the classification data for the game action and generate one or more expert recommendations for the game action, causing the one or more expert recommendations to be displayed to the user, receiving a selection of an expert from the one or more expert recommendations for the game action from the user, substituting the expert for the user during a segment of the portion of the video game being played in play mode so that the expert can execute the game action for the user, and, upon completion of the segment by the expert, substituting back the user for the expert so the user can resume playing the portion of the video game in the play mode.

In one embodiment, the method further includes causing a previously published video feed of the expert playing the segment of the portion of the video game being played in play mode to be streamed to the user for viewing, with the previously published video feed of the expert having been published when the expert originally played the segment of the portion of the video game being played in play mode.

In another example embodiment, a system for identifying game events is provided. The system, which has a server for executing games, includes a spectator processor, a recording processor, and a storage system. The spectator processor provides a channel for a spectator to view a video game being played by a player. The spectator processor is configured to detect a tag selection in a scene of the video game while the video game is being played by the player. The spectator processor is further configured to identify a screen location that is associated with the tag selection and examine the screen location to identify a game action occurring proximate to the tag selection. The recording processor is configured to access a recording of the video game that includes the game action. The recording includes a plurality of frames, and the plurality of frames is associated with state data generated when the video game was played by the player and metadata descriptive of progress of the video game by the player. The recording processor is further configured to examine the state data to quantify the recording and to assign a significance value to the recording, where the significance value is calculated from a combination of the state data and the metadata. The storage system stores a video clip from the recording associated with the tag selection when the significance value exceeds a predefined significance threshold. The video clip is made accessible for viewing in a watch mode and playable in a play mode, wherein the play mode uses the state data to execute a portion of the video game that relates to the video clip.

In one embodiment, the state data is configured to generate contextual features occurring in the scene and the metadata is configured to identify success features in the video game for the player, and the recording processor is configured to process the contextual features and the success features to generate classification data that is processed by a significance model, where the significance model is configured to produce the significance value for the recording.

In one embodiment, the system further includes a help processor for providing assistance to a user with a game action. The help processor is configured to receive, during play of the portion of the video game in the play mode, a request from the user for assistance with a game action and substitute the player for the user during a segment of the portion of the video game being played in play mode. Upon completion of the segment, the help processor is configured to substitute back the user for the player to complete the portion of the video game being played in play mode.

In one embodiment, the system further includes an expert processor for providing expert assistance to a user with a game action. The expert processor is configured to receive, during play of the portion of the video game in the play mode, a request from the user for expert assistance with a game action and determine a context for the game action by extracting features of a scene in which the game action occurs and processing the features with one or more classifiers to generate classification data for the game action. The expert processor is further configured to use an expert model to process the classification data for the game action and generate one or more expert recommendations for the game action. Still further, the expert processor is configured to cause the one or more expert recommendations to be displayed to the user and receive a selection of an expert from the one or more expert recommendations for the game action from the user. The expert processor is also configured to substitute the expert for the user during a segment of the portion of the video game being played in play mode so that the expert can execute the game action for the user. Upon completion of the segment by the expert, the expert processor is configured to substitute back the user for the expert so the user can resume playing the portion of the video game in the play mode.

In one embodiment, the system further includes both a help processor and also an expert processor.

In one embodiment, the system further includes a watch mode processor for enabling a user to view the video clip in the watch mode. The watch mode processor is configured to receive a request from the user to view the video clip in the watch mode and cause the video clip to be streamed to the user for viewing. In one embodiment, the system further includes a play mode processor enabling a user to play the video clip in the play mode. The play mode processor is configured to receive a request from the user to play the video clip in the play mode and transmit game code and the state data to enable play of a portion of the video game that corresponds to the video clip in the play mode. A play execution engine executes the game code using the state data, and the play mode processor is further configured to cause the portion of the video game to be streamed to the user so that the user can interactively play the portion of the video game in the play mode.

In yet another example embodiment, a computer readable medium containing non-transitory program instructions for identifying game events is provided. The computer readable medium includes program instructions for providing a channel for a spectator to view a video game being played by a player, program instructions for detecting a tag selection in a scene of the video game while the video game is being played by the player, program instructions for identifying a screen location that is associated with the tag selection, and program instructions for examining the screen location to identify a game action occurring proximate to the tag selection. The computer readable medium also includes program instructions for accessing a recording of the video game that includes the game action, where the recording includes a plurality of frames, and the plurality of frames is associated with state data generated when the video game was played by the player and metadata descriptive of progress of the video game by the player. The computer readable medium further includes program instructions for examining the state data to quantify the recording, where the examining is configured to assign a significance value to the recording, and the significance value is calculated from a combination of the state data and the metadata. Still further, the computer readable medium includes program instructions for storing a video clip from the recording associated with the tag selection when the significance value exceeds a predefined significance threshold. The video clip is made accessible for viewing in a watch mode and playable in a play mode, and the play mode uses the state data to execute a portion of the video game that relates to the video clip.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method of identifying game events in a video game so that spectators watching a skilled player play the video game can come back later and interact again with the identified game events. In particular, the embodiments described herein enable spectators to tag game events so that the tagged game events can be experienced again at a later point in time. For example, the spectators can watch a replay of the skilled player playing the tagged game events. Alternatively, the spectators can play the tagged game events in the video game for themselves. In the event a spectator playing the video game (herein referred to as the "user" when playing the game) cannot keep up with the level of play required by the tagged game events, the user can request expert assistance playing the game. The expert assistance can be provided by an "auto play" feature in which the skilled player (that is, the player who was being watched when the spectator tagged the game event) plays the tagged events for the user or by an expert selected based on the scene in which the tagged events occur. By providing spectators with increased interaction in the video game through the tagging of game events, the popularity of the video game can be increased, which can lead to increased viewership for the video game.

Figure 1:
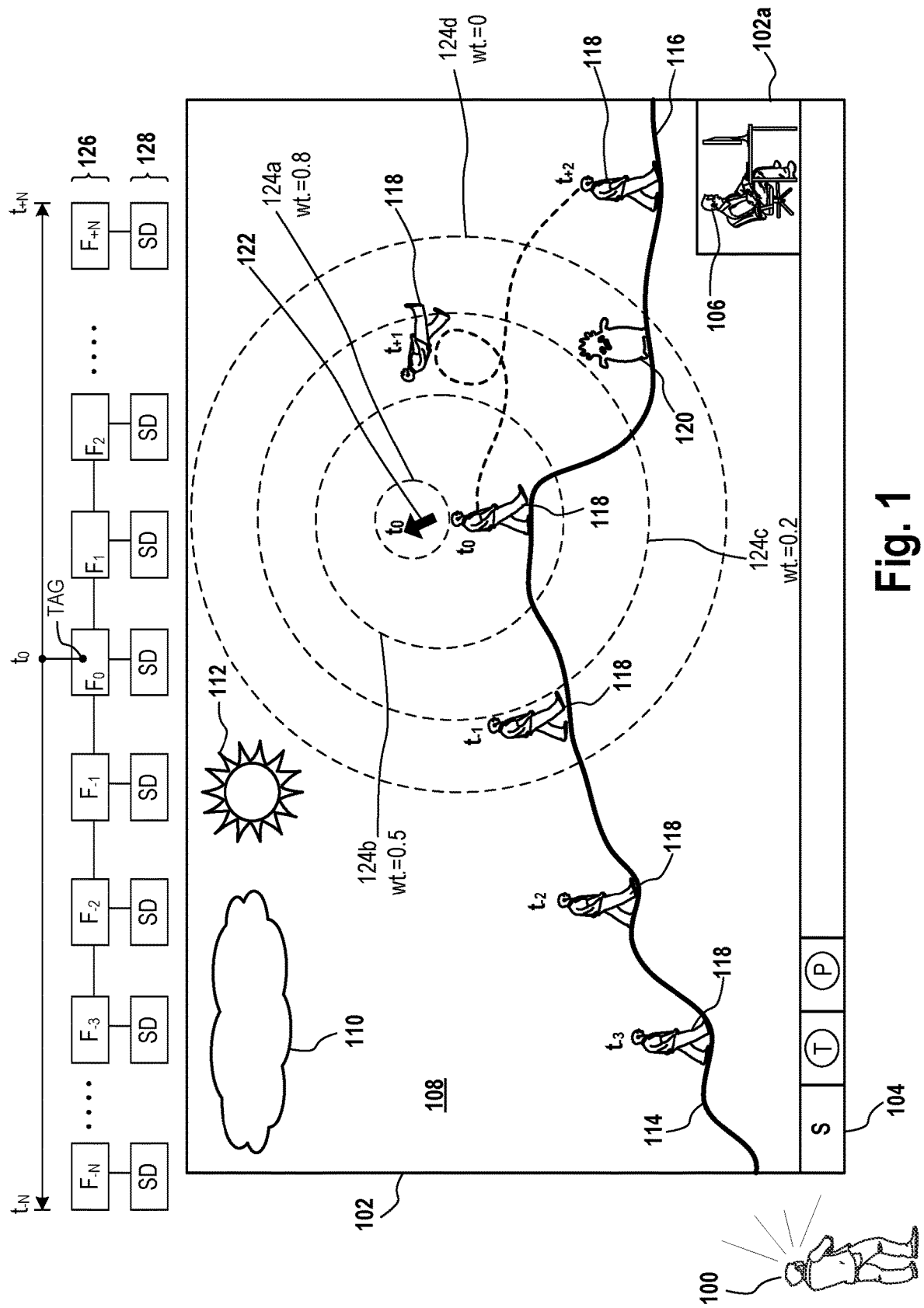
FIG. 1 is a simplified schematic diagram that illustrates a spectator watching an online video game being played by another person, in accordance with one embodiment.

FIG. 1 is a simplified schematic diagram that illustrates a spectator watching an online video game being played by another person, in accordance with one embodiment. As shown in FIG. 1, spectator 100 is watching the online video game on a screen 102, which can be a TV, a computer monitor, a laptop, a smartphone, etc. The online video game has been published to an online platform for sharing with spectators. The online platform, e.g., website, app, etc., can be any suitable platform for streaming live and recorded video over the internet. In one embodiment, the online platform is part of a gaming network, e.g., the PlayStation Network (PSN), which allows users, e.g., spectators, to login and watch live games as well as recordings of games (video on demand). As shown in FIG. 1, spectator 100 has logged into the gaming network in spectator mode on a spectator channel, as indicated by the letter "S" appearing in the taskbar 104 at the bottom of screen 102, to watch a person play the online video game. The taskbar 104 also includes the letters "T" and "P," which refer to "tagging" and "play mode," respectively. Tagging and play mode are in-game tools which can be selected by the spectator via a user interface described in more detail below with reference to FIG. 2. As will be described in more detail below, when tagging is selected the spectator can tag game events so that the tagged game events can be experienced again at a later point in time. The spectator can experience the tagged game events again either by 1) watching a replay of the tagged game events (in watch mode) or 2) playing the tagged game events for themselves (in play mode).

The person playing the online video game being watched by the spectator 100 can be any player of interest to the spectator. For example, the player can be a highly skilled player who is recognized for having exceptional ability in one or more video games, e.g., Ninja or a popular esports player. In one embodiment, a real-time video of the player 106 playing the video game is shown in a portion 102a of the screen 102 as the game is being played. As shown in FIG. 1, the portion 102a of the screen 102 is located in the lower right hand corner of the screen to avoid significantly blocking the view of any game play.

The scene 108 of the video game shown in FIG. 1 includes a number of features including cloud 110, sun 112, hill 114, and valley 116. The scene 108 of the video game also includes playing character 118, which is being controlled by player 106, and non-playing character (NPC) 120, which is a monster in the embodiment of FIG. 1. To advance through scene 108, player 106 must first guide playing character 118 to the top of the hill 114 and then do a back flip from the top of the hill and land safely in the valley 116. The back flip should be executed so that the playing character 118 lands a safe distance beyond the NPC (monster) 120 and thereby avoids getting attacked by the monster. If the playing character 118 does not jump far enough to go past the monster 120 or does not land safely, the monster can attack the playing character. If the playing character 118 succumbs to the monster 120 in an attack, then the video game may end or a life may be used.

In the event spectator 100 wants to experience the game action shown in scene 108 again, the spectator can tag the game action by clicking on the scene with a suitable input device, e.g., a video game controller, a mouse, a digital pen, etc. As shown in FIG. 1, spectator 100 has made a tag selection 122 in scene 108 by clicking on the scene just above the top of hill 114. The tag selection 122 is indicated by the arrow shown in FIG. 1. The point in time at which the spectator 100 made the tag selection in scene 108 is designated as $t_0$, which serves as a reference point for storing a video clip, as will be explained in more detail below. As can be seen in the timeline at the top of FIG. 1, points in time that occur before $t_0$ are designated as occurring at $t_{-N}$ and points in time that occur after $t_0$ are designated as occurring at $t_{+N}$, where N refers to a unit of time, e.g., a second. As shown in scene 108 of the video game, the playing character 118 advances from the left hand side of the screen 102 to the right hand side of the screen as the game play progresses. In particular, as shown in FIG. 1, playing character 118 is toward the bottom of the hill 114 at $t_{-3}$, near the middle of the hill at $t_{-2}$, near the top of the hill at $t_{-1}$, at the top of the hill at $t_0$, in the middle of a back flip at $t_{+1}$, and getting ready to land at $t_{+2}$.

Once a tag selection has been made, an assessment is made to ascertain whether the tag selection identifies relevant game action. As part of this assessment, a determination is made as to where the spectator 100 made the tag selection 122. In particular, the screen location associated with the tag selection is identified. The screen location associated with the tag selection is the location on the screen at which the input for the tag selection was received. In one embodiment, the screen location is expressed in terms of pixel location to obtain a more precise location for the tag selection on a per frame basis. In this embodiment, in the example of FIG. 1, the pixel location of tag selection 122, which is indicated by the arrow, would be identified as the screen location associated with the tag selection. The screen location associated with the tag selection 122 is then examined to identify whether a game action occurs proximate to the tag selection. In one embodiment, the examination of the screen location includes assigning a weighting value to a game action based on the distance from the screen location to the game action. The weighting value can be assigned to the game action by defining a plurality of weighting regions around the screen location, where each of the weighting regions has an assigned weighting value. Each weighting region can then be examined to determine whether a game action is occurring within the weighting region. As shown in FIG. 1, in one embodiment, the plurality of weighting regions 124a, 124b, 124c, and 124d includes a plurality of concentric circles, where each of these concentric circles has the screen location as a common center. Those skilled in the art will appreciate that the number of weighting regions as well as the size and shape of the weighting regions can be varied from that shown in FIG. 1 to meet the needs of particular applications. As shown in FIG. 1, weighting region 124a has a weighting value of 0.8, weighting region 124b has a weighting value of 0.5, weighting region 124c has a weighting value of 0.2, and weighting region 124d has a weighting value of zero.

In one embodiment, the screen location for the tag selection 122 is used to exclude any game action with a weighting value below a weighting threshold. This is done to avoid the inclusion of game actions that are not relevant to the game play occurring proximate to the tag selection. For example, in a world-based video game, there are a lot of activities taking place in the game beyond just the activity of a single player. In one embodiment, screen locations having a weighting value below a predefined weighting threshold are excluded. In other words, as will be explained in more detail below, no video clip will be stored for the excluded game action. In one embodiment, the weighting threshold is 0.2 but this threshold may be varied to meet the needs of particular applications. In the example of FIG. 1, at the time, $t_0$, at which the tag selection 122 was made, playing character 118 is about to do a back flip from the top of hill 114. As at least a portion of playing character 118 falls within weighting region 124b at the time, $t_0$, the game action involving playing character 118 will be assigned the weighting value of 0.5, which is the weighting value assigned to weighting region 124b. As this weighting value exceeds the weighting threshold of 0.2, the game action involving playing character 118 will be included and a video clip of this game action will be stored, as will be explained in more detail below.

With continuing reference to FIG. 1, as a video game is being played the gaming network, e.g., the PlayStation Network (PSN), automatically records video of the game play and the video typically includes 30 frames per second (fps). Thus, when a video clip is stored, the video clip will include a plurality of frames depending upon the length of the clip. As shown in FIG. 1, the plurality of frames 126 includes frame $F_0$, which is the frame that corresponds to the point in time, $t_0$, at which the tag selection 122 was made (the tag selection is indicated within frame $F_0$ by the designation "tag"). The frames that correspond to points in time occurring before the tag selection 122 was made are designated as $F_{-1}, F_{-2}, \ldots F_{-N}$ and the frames that correspond to points in time after the tag selection 122 was made are designated as $F_{+1}, F_{+2}, \ldots F_{+N}$. Each of the plurality of frames 126 is associated with state data 128, which is indicated in FIG. 1 by the designation "SD." The state data 128 is generated when the video game was played by the player, e.g., player 106, and includes specific game logic to enable the game to be played again from the same location with the same variables. The plurality of frames 126 is also associated with metadata, which is more descriptive of the player's game progress and can include, by way of example, game score, game trophies, historical scores, friends, likes, the player's history, etc. As will be explained in more detail below, the state data 128 and the metadata are used to quantify a video clip by assigning a significance value to the video clip.

Figure 2:
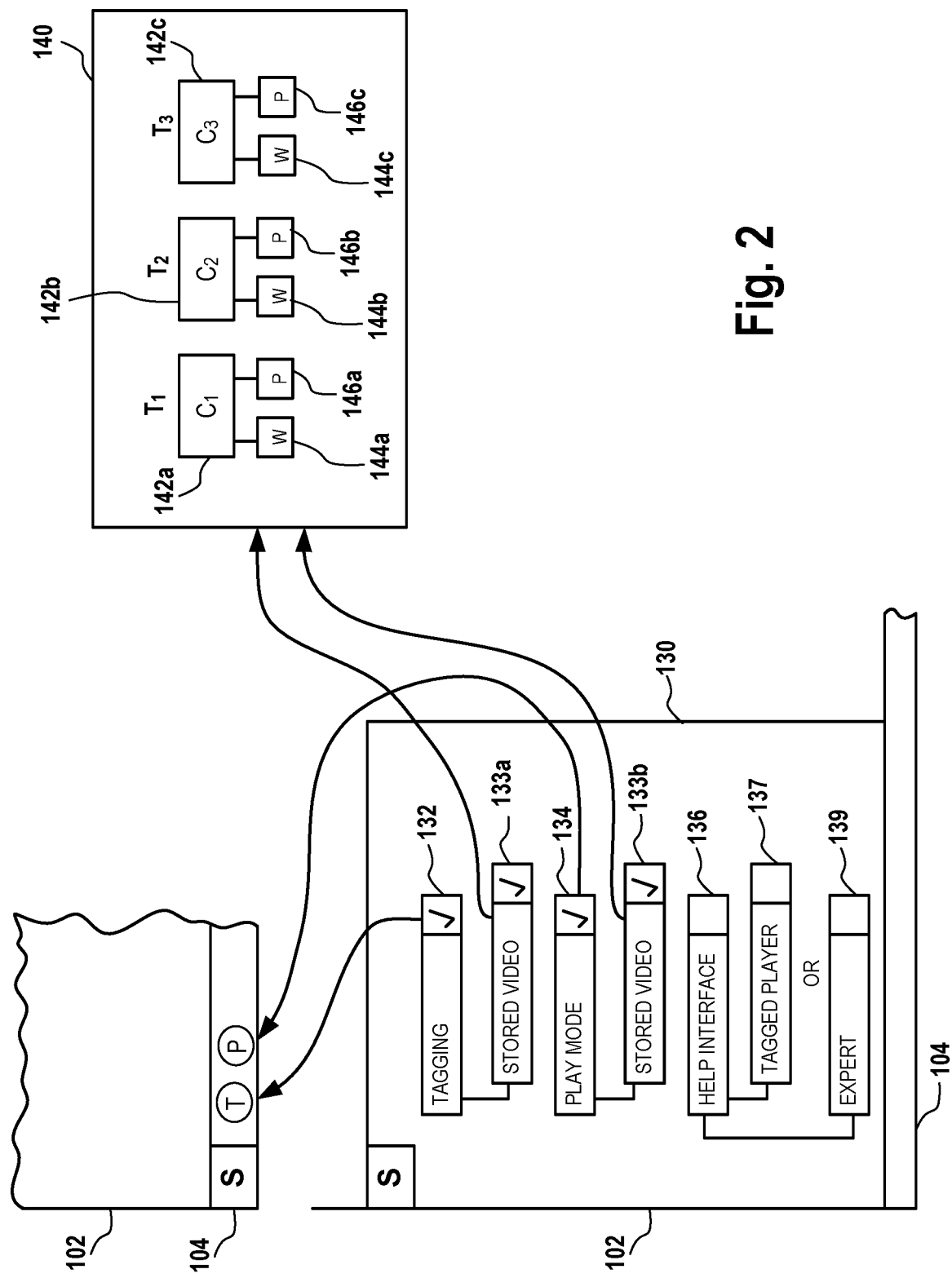
FIG. 2 is a simplified schematic diagram that illustrates an example user interface for enabling a spectator to select in-game tools for tagging a game event and for playing a tagged game event, in accordance with one embodiment.

FIG. 2 is a simplified schematic diagram that illustrates an example user interface for enabling a spectator to select in-game tools for tagging a game event and for playing a tagged game event, in accordance with one embodiment. As shown in FIG. 2, user interface 130 includes graphical buttons for selecting various in-game tools including a tagging button 132, a play mode button 134, and a help interface button 136. The user interface 130 can slide or otherwise pop up on the screen 102 when the spectator 100 clicks on a suitable portion of taskbar 104, e.g., the letter "S" which indicates spectator mode. To select the tagging of game events, the spectator 100 clicks the tagging button 132 to insert a check mark or other suitable icon. When the tagging button 132 is clicked, the letter "T" appears in the taskbar 104. To enable the spectator 100 to go back and access the video clips associated with tagged game events, stored video button 133a is provided. When the spectator 100 clicks on the stored video button 133a, the spectator is presented with user interface 140, which includes the video clips associated with the game events that have been tagged by the spectator. In particular, user interface 140 includes a listing of video clips 142a-c, which, as shown in FIG. 2, includes video clips 142a (clip $C_1$ which is associated with tag $T_1$), 142b (clip $C_2$ which is associated with tag $T_2$), and 142c (clip $C_3$ which is associated with tag $T_3$). Each of the listings for video clips 142a-c includes a graphical button 144a-c for selecting "watch mode," which enables the spectator 100 to watch the selected video clip, and a graphical button 146a-c for selecting "play mode," which enables the spectator to play a portion of the video game that includes the selected video clip. As shown in FIG. 2, graphical button 144a enables watch mode for video clip 142a (clip $C_1$), graphical button 144b enables watch mode for video clip 142b (clip $C_2$), and graphical button 144c enables watch mode for video clip 142c (clip $C_3$). Graphical button 146a enables play mode for video clip 142a (clip $C_1$), graphical button 146b enables play mode for video clip 142b (clip $C_2$), and graphical button 146c enables play mode for video clip 142c (clip $C_3$).

Still referring to FIG. 2, when the play mode button 134 is clicked, the letter "P" appears in the taskbar 104. To enable the spectator 100 to go back and play a portion of the video game that includes the selected video clip, stored video button 133b is provided. When the spectator 100 clicks on the stored video button 133b, the spectator is presented with user interface 140, which, as described in detail above, includes a listing of the video clips associated with the game events that have been tagged by the spectator. By clicking on one of the graphical buttons 146, e.g., graphical button 146b (which relates to clip $C_2$), the spectator 100 can play a portion of the video game that includes the selected video clip, e.g., clip $C_2$. As noted above, the user interface 130 also includes help interface button 136, which is provided to enable the spectator turned user to request assistance when he or she cannot keep up with the level of play required by the tagged game events. In one embodiment, the help options include 1) the tagged player (the player who was being watched when the spectator tagged the game event), and 2) an expert selected based on skill and expertise relative to a particular scene in a video game. In another embodiment, the help options also can include an artificial intelligence (AI) system provided by the platform, e.g., the PlayStation Network (PSN), and/or the developer of the video game title. To enable the tagged player option in which the tagged player plays the tagged game event for the user, the user clicks on the tagged player button 137. To request expert assistance, the user clicks on the expert button 139. Additional details regarding the help options, including the tagged player option and the expert option, are set forth below with reference to FIGS. 6A and 6B.

Figure 3A:
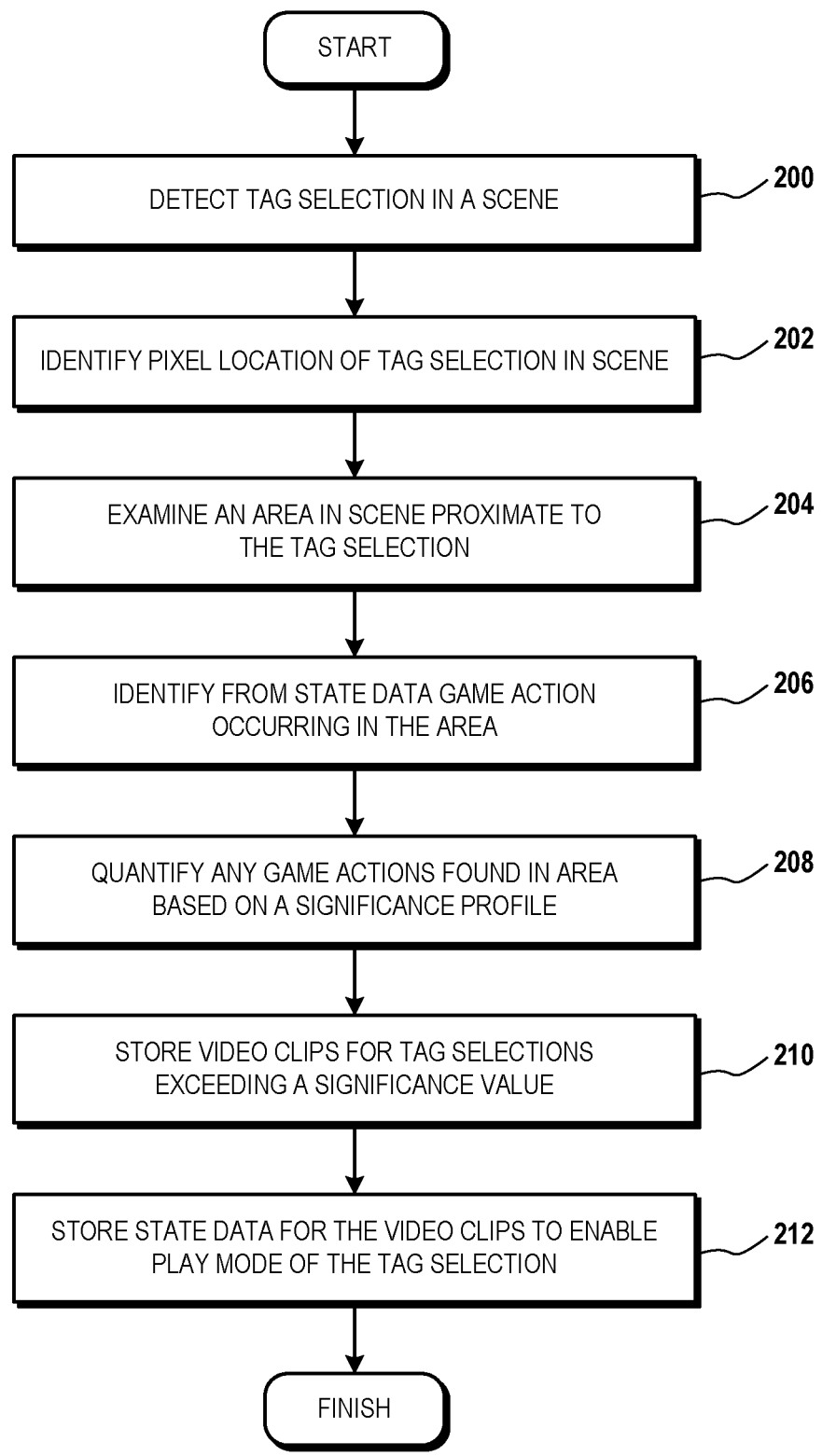
FIG. 3A is a flow diagram illustrating the method operations performed in identifying game events, in accordance with an example embodiment.

FIG. 3A is a flow diagram illustrating the method operations performed in identifying game events, in accordance with an example embodiment. The method begins in operation 200, which includes detecting a tag selection in a scene of a video game. In one embodiment, the tag selection is detected by detecting the input, e.g., a tap on a touchpad, a click from a mouse, digital pen, etc., received from an in-game tagging tool. Operation 202 includes identifying the pixel location of the tag selection in the scene of the video game. The pixel location of the tag selection provides a more precise location for the tag selection on a per frame basis. Operation 204 includes examining an area in the scene of the video game proximate to the tag selection. The objective of this examination is to determine whether any game action is occurring in the scene in the vicinity of the tag selection. If no game action is found in the area of the scene proximate to the tag selection, then the tag selection can be dismissed as being a bad tag that does correspond to a relevant game action. Operation 206 includes identifying from state data the game action that is occurring in the area proximate to the tag selection. The state data includes specific game logic to enable the game to be played again from the same location and with the same variables, e.g., if the user chooses to replay a portion of the video game including the tagged game action. By analyzing the state data, the nature of the game action occurring proximate to the tag selection can be identified. For example, the state data can be used to determine whether the game action involves a relatively difficult game moves, e.g., making multiple jumps in a short time frame, moving very fast, stealing a sword, etc. or relatively easy game moves, e.g., walking slowly on a path, sitting on a bench, etc.

The method continues in operation 208, which includes quantifying any game actions found in the area of the scene of the video game based on a significance profile. In one embodiment, the significance profile is a look-up table that is pre-coded with assigned values for game actions, with more difficult game actions being assigned a higher value than less difficult game actions. Operation 210 includes storing video clips for tag selections exceeding a predefined significance value. If the significance value assigned to the game action associated with a tag selection exceeds the predefined significance value, then a video clip for the tag selection will be stored. On the other hand, if the significance value assigned to the game action associated with a tag selection falls below the predefined significance value, then a video clip will not be stored. In this manner, the storing of video clips involving relatively easy game moves, which are unlikely to be of interest to a user, is avoided. Operation 212 includes storing the state data for the video clips to enable play mode of the tag selection. In one embodiment, the state data is captured and stored separately from the video clip, e.g., as separate data from the video clip. As shown in FIG. 1, each frame of video includes state data which was generated when the video game was played by the player 106. Thus, to be able to play the game again from the same location and with the same variables, the state data is required so that a portion of the video game including the video clip associated with the tag selection can be played by a user in play mode. Once the state data has been stored, the method is done.

Figure 3B:
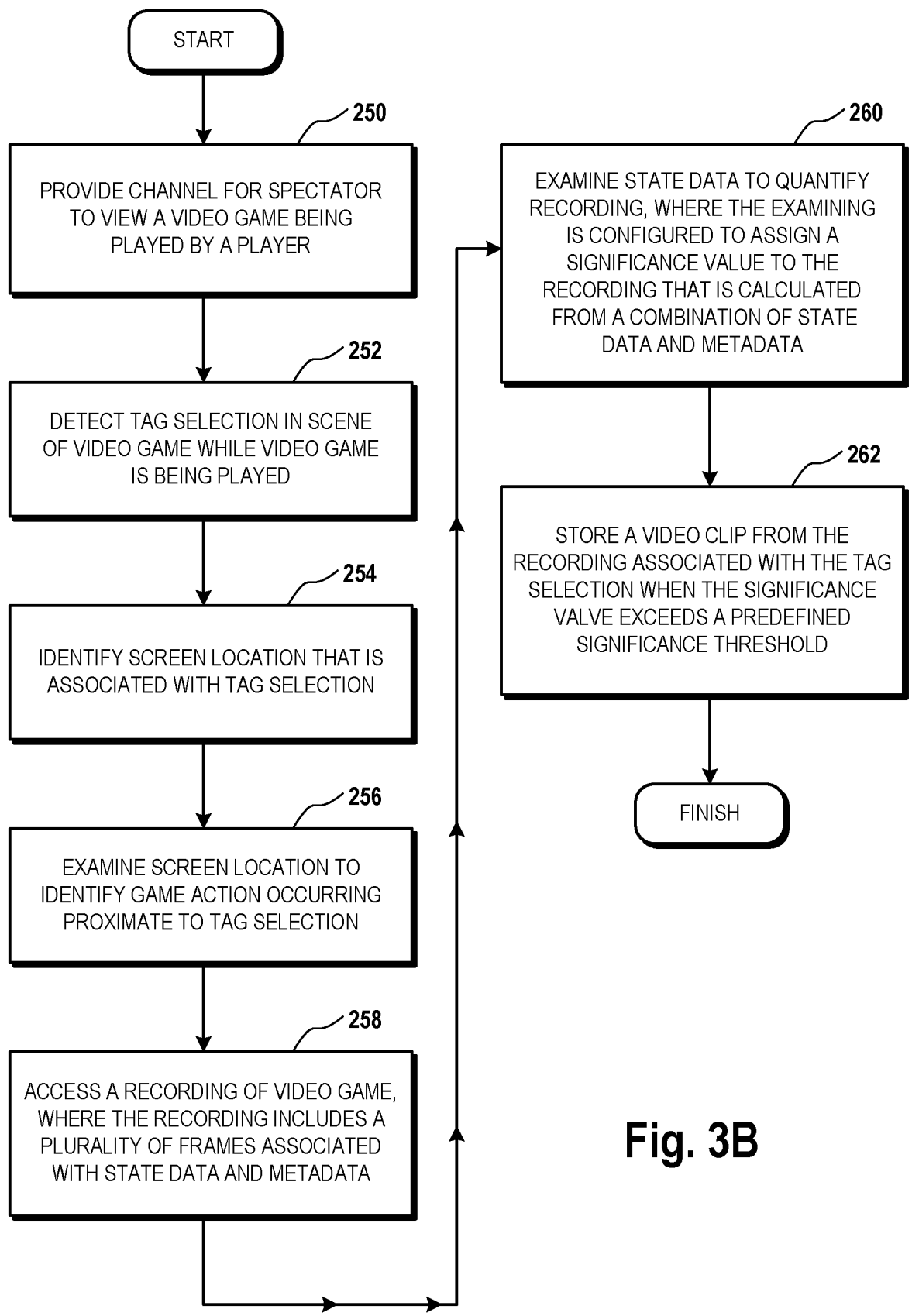
FIG. 3B is a flow diagram illustrating the method operations performed in identifying game events, in accordance with another example embodiment.

FIG. 3B is a flow diagram illustrating the method operations performed in identifying game events, in accordance with another example embodiment. The method begins in operation 250, which includes providing a channel for a spectator to view a video game being played by a player. The channel can be provided by any suitable online platform. In one embodiment, the channel is provided by a gaming network, e.g., the PlayStation Network (PSN), which allows users, e.g., spectators, to login and watch live games. The player can be any player who publishes games for viewing and in which the spectator has in interest in watching. In one embodiment, the player is a highly skilled player, e.g., Ninja or a popular esports player. Operation 252 includes detecting a tag selection in a scene of a video game while the video game is being played. In one embodiment, the tag selection is detected by detecting the input, e.g., a tap on a touchpad, a click from a mouse, digital pen, etc., received from an in-game tagging tool as the video game is being played. Operation 254 includes identifying a screen location that is associated with the tag selection. The screen location associated with the tag selection is the location on the screen at which the input for the tag selection was received. Operation 256 includes examining the screen location to identify game action occurring proximate to the tag selection. In one embodiment, the examination of the screen location includes assigning a weighting value to a game action based on the distance from the screen location to the game action. The weighting value can be assigned to the game action by defining a plurality of weighting regions around the screen location, where each of the weighting regions has an assigned weighting value. Each weighting region can then be examined to determine whether a game action is occurring within the weighting region. In one embodiment, the plurality of weighting regions, e.g., weighting regions 124a, 124b, 124c, and 124d shown in FIG. 1, includes a plurality of concentric circles, where each of these concentric circles has the screen location as a common center. Those skilled in the art will appreciate that the number of weighting regions as well as the size and shape of the weighting regions can be varied from that shown in FIG. 1 to meet the needs of particular applications.

Operation 258 includes accessing a recording of the video game, where the recording includes a plurality of frames associated with state data and metadata. The state data, which was generated when the video game was played by the player, e.g., player 106 shown in FIG. 1, includes specific game logic to enable the game to be played again from the same location and with the same variables. The metadata is descriptive of a user's progress in the video game and can include, by way of example, game score, game trophies, friends, likes, historical scores, the player's history, etc. As such, in one embodiment, the state data is configured to generate contextual features occurring in a scene of the video game and the metadata is configured to identify success features in the video game for the player. Operation 260 includes examining the state data and the metadata to quantify the recording of the video game, where the examining is configured to assign a significance value to the recording that is calculated from a combination of the state data and the metadata. In one embodiment, the contextual features occurring in the scene of the video game (from the state data) and the success features in the video game for the player (from the metadata) are processed by one or more classifiers to generate classification data. The classification data, in turn, is processed by a significance model, which is configured to produce the significance value for the recording. Additional details regarding the generation of the significance value for the recording are set forth in more detail below with reference to FIG. 4A.

Operation 262 includes storing a video clip from the recording associated with the tag selection when the significance value exceeds a predefined significance threshold. In one embodiment, the predefined significance threshold is selected to ensure that only video clips including game action that is one or more of compelling, exceptional, and exciting are stored. In this manner, the storing of video clips that include game action that might be considered to be routine or even boring is avoided. In one embodiment, an event is considered exceptional by quantifying actions taken in a video game. Generally speaking, actions in video games are tied to the context in which the actions are taken in the game. By way of example, in a driving game, an action of speeding down a raceway with no other cars on the road will be quantified differently if the speeding occurred in traffic or in challenging terrain. Accordingly, the significance value assigned to the racing action will differ based not only on the score obtained, but the context in which the racing action occurred. In this manner, the significance score associated to actions will be based on multidimensional criteria with predefined assignable values.

In one embodiment, the length of the video clip is based on the significance value of the recording such that a length of a video clip related to a relatively high significance value is greater than a length of a video clip related to a relatively low significance value. Additional details regarding the length of the stored video clips are set forth in more detail below with reference to FIG. 4B. Once the video clip is stored (or not stored depending upon the significance value of the recording), the method is done.

Figure 4A:
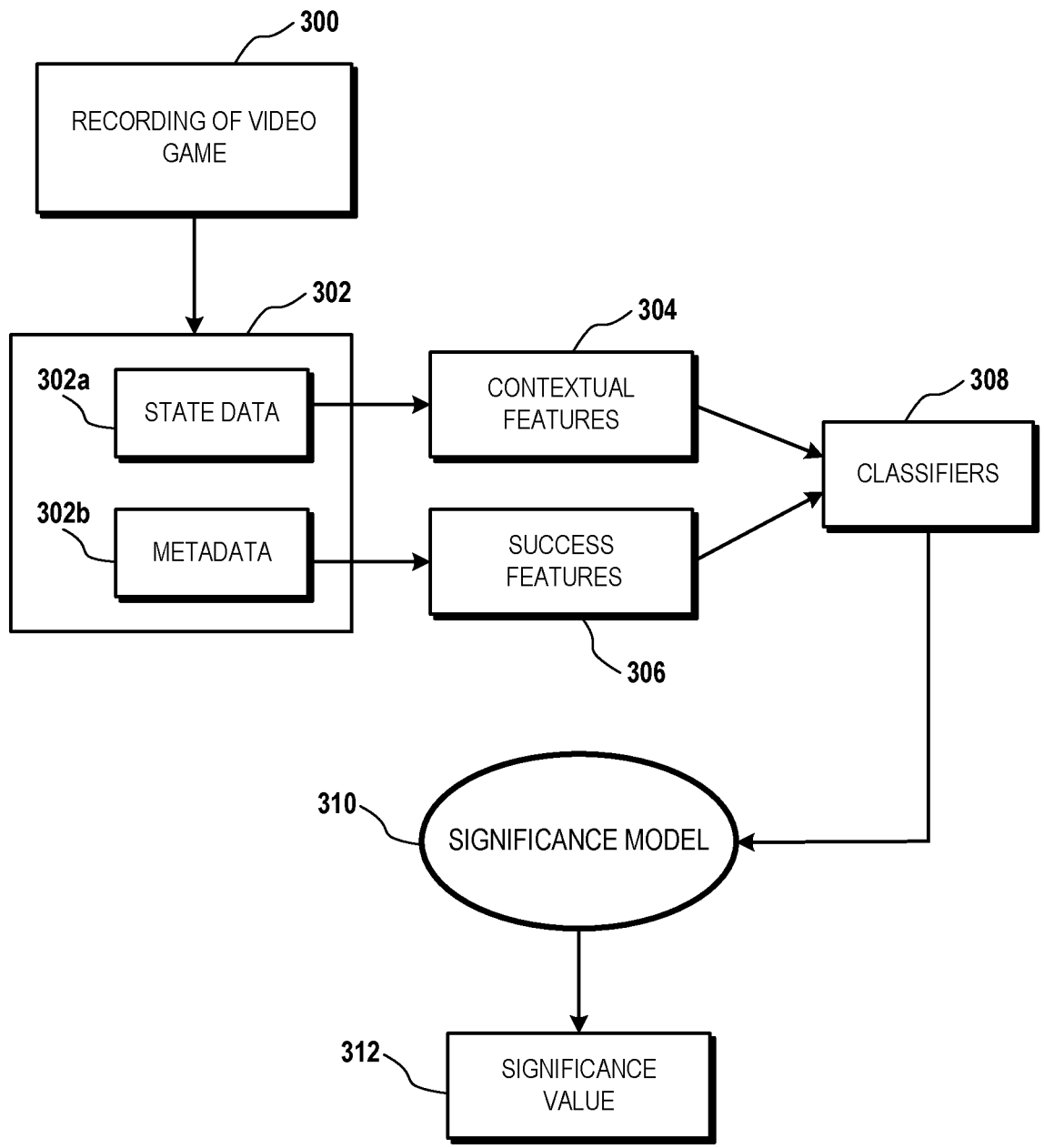
FIG. 4A is a simplified schematic diagram that illustrates additional details regarding the generation of the significance value for the recording associated with the tag selection, in accordance with one embodiment.

FIG. 4A is a simplified schematic diagram that illustrates additional details regarding the generation of the significance value for the recording associated with the tag selection, in accordance with one embodiment. As shown in FIG. 4A, recording 300 is a recording of the video game associated with the tag selection. As described above, the recording 300 includes a plurality of frames associated with state data and metadata. In one embodiment, a combination of data 302, which includes state data 302a and metadata 302b, is used to quantify the recording 300. In one embodiment, state data 302a is configured to generate contextual features 304 occurring in the scene of the video game. By way of example, the contextual features 304 occurring in the scene of the video game can include rocks, dirt, clouds, the sun, a sword, a tree, a wall, etc. In one embodiment, the metadata 302b is configured to identify success features 306 in the video game for the player. By way of example, the success features 306 in the video game for the player can include the player's game score, the player's game trophies, the player's historical scores, etc. In one embodiment, the contextual features 304 and the success features 306 are processed by one or more classifiers 308 to generate classification data. The processing by classifiers 308 looks at the contextual features 304 and the success features 306 and, where applicable, generates classification data that includes groups of features that can be logically linked together. For example, in a case where the contextual features 304 include dirt and rocks, the processing by classifiers 308 might generate classification data that indicates the existence of a hill or a mountain in the scene of the video game because both a hill and a mountain include dirt and rocks.

The classification data generated by classifiers 308 is processed by a significance model 310, which is configured to produce a significance value 312 for the recording 300 of the video game. In one embodiment, the significance model 312 is configured to process inputs and learn relationships between the inputs. In some embodiments, learning algorithms may be processed by the significance model 312 in order to understand the data relationships. By way of example, the learning types may include one or more of supervised learning, unsupervised learning, or reinforced learning. Specific examples of learning algorithms may include one or more of linear regression, logistic regression, decision trees, support vector machine, Naive Bayes, k-nearest neighbors, K-Means, Random Forest, Dimensionality Reduction algorithms, and Gradient Boosting algorithms. Generally speaking, the significance model 312 is configured to process inputs from the various classifiers and then output a significance score (or significance value) for given game actions based on the context in which the game action takes place. Over time, the significance model 312 is configured to be refined so as to provide more accurate significance scores that are useful and highly accurate at predicting the significance of the game action that was identified.

In one embodiment, viewers of the recording of the video game, e.g., the spectators and/or the players and/or the game developers, can provide feedback regarding the accuracy of significance scores attributed to game events. For example, a popular player may decide that certain game events are not so significant and downvote suggestions made by the system. In the case of spectators, the feedback regarding significance scores received from spectators can be used to filter and/or adapt the significant game events to their particular tastes. The feedback regarding the significance scores received from, e.g., the players, the spectators, and the game developers, can be transmitted to the significance model 312 to help refine the significance model over time. In this manner, the significance model 312 can be refined to recognize fewer game events as being significant, and thereby prevent the system for identifying game events described herein from generating too many significant tagged game events.

In one embodiment, the significance value 312 is produced on a scale from 1 to 10. A low significance value, e.g., a significance value of 1 or 2, indicates that the recording 300 includes game action that might be considered to be routine or even boring. Thus, in embodiments where the predefined significance threshold is 3, a video clip from recording 300 having a low significance value of 1 or 2 would not be stored. On the other hand, a high significance value, e.g., a significance value of 9 or 10, indicates that the recording 300 includes game action that might be considered to be one or more of compelling, exceptional, and exciting. Thus, in embodiments where the predefined significance threshold is 3, a video clip from any recording 300 having a significance value of at least 3, including recordings having a high significance value of 9 or 10, would be stored. Furthermore, in one embodiment, the length of the video clip that is stored from the recording 300 is based on the significance value 312 of the recording. Thus, the length of a video clip related to a relatively high significance value will be greater than the length of a video clip related to a relatively low significance value. Additional details regarding the length of the video clips stored from recording 300 are set forth below with reference to FIG. 4B.

Figure 4B:
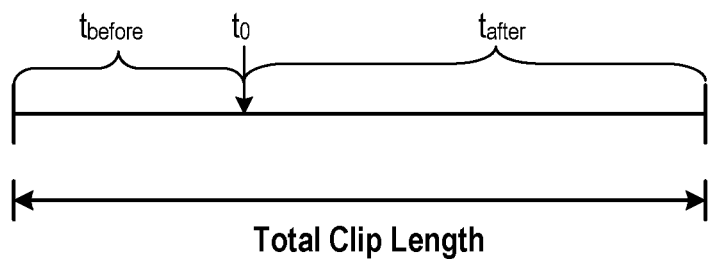
FIG. 4B illustrates the total length of a video clip based on the significance value of the recording from which the video clip is stored, as well as the lengths of time included in the video clip both before and after the tag selection, in accordance with one embodiment.

FIG. 4B illustrates the total length of a video clip based on the significance value of the recording from which the video clip is stored, as well as the lengths of time included in the video clip both before and after the tag selection, in accordance with one embodiment. As shown in the table included in FIG. 4B, in one embodiment, for a recording having a significance value of 3 (on a scale from 1 to 10 as described above), the video clip stored from the recording of the video game will have a total clip length of 12 seconds. The total clip length of 12 seconds includes 5 seconds before the tag selection and 7 seconds including and after the tag selection. As shown in the timeline included in FIG. 4B, the tag selection occurs at time $t_0$, the time occurring before the tag selection is $t_{before}$, and the time occurring after the tag selection is $t_{after}$. In one embodiment, for a recording having a significance value of 6, the video clip stored from the recording of the video game will have a total clip length of 15 seconds. The total clip length of 15 seconds includes 6 seconds before the tag selection and 9 seconds including and after the tag selection. In one embodiment, for a recording having a significance value of 9, the video clip stored from the recording of the video game will have a total clip length of 20 seconds. The total clip length of 20 seconds includes 8 seconds before the tag selection and 12 seconds including and after the tag selection. Those skilled in the art will appreciate that the total clip length, as well as lengths of time included before, including, and after the tag selection, can be varied from that shown in FIG. 4B to suit the needs of particular situations.

Figure 5:
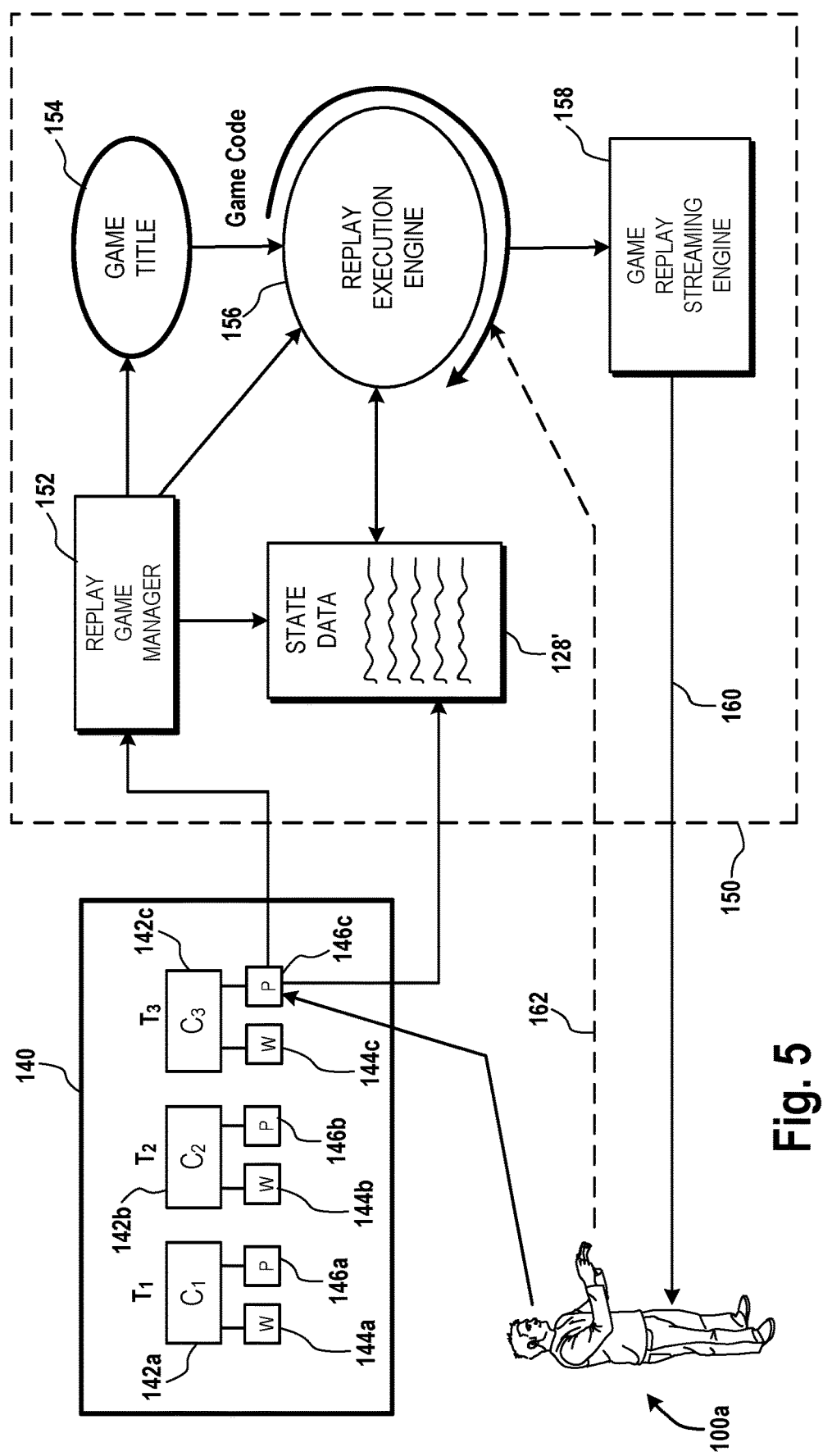
FIG. 5 is a simplified schematic diagram that illustrates the manner in which a user can play of a portion of the video game that corresponds to a video clip in play mode, in accordance with one embodiment.

FIG. 5 is a simplified schematic diagram that illustrates the manner in which a user can play of a portion of the video game that corresponds to a video clip in play mode, in accordance with one embodiment. To initiate play mode, a user 100a accesses user interface 140 which, as described above with reference to FIG. 2, is presented to the user when the play mode is selected and the stored video button 133b (see FIG. 2) associated with the play mode is clicked. As shown in FIG. 5, user 100a (previously referred to as spectator 100) has clicked on graphical button 146c to enable play mode for video clip 142c (clip $C_3$) and this input is communicated to cloud game server 150. In particular, the input requesting play mode for video clip 142c (clip $C_3$) is communicated to replay game manager 152 and state data library 128', which includes the state data associated with the video frames included in the video clip. The replay game manager 152 communicates with game title manager 154 to identify the title of the video game being played in the video clip 142c. The game title manager 154 identifies the title of the video game and sends the game code for the video game to replay execution engine 156. The replay game manager 152 also communicates with replay execution engine 156 to inform the replay execution engine of the state data needed to replay the portion of the video game associated with video clip 142c. The replay execution engine 156 obtains the state data associated with the video frames associated with video clip 142c from state data library 128'. The replay execution engine 156 then launches the game code for the video game and uses this state data in the execution of the game code. Thus, when the user begins to play the portion of the video game that corresponds to the video clip in play mode, the video game is at the same point in time and under the same conditions as when player 106 (see FIG. 1) was playing the video game and the tag selection was made. The replay execution engine 156 sends a raw feed of the video data to game replay streaming engine 158, which compresses the raw feed of the video data and performs other needed processing to generate stream 160 of the game replay. The game replay streaming engine 158 transmits stream 160 of the game replay to user 100a. At the same time, the user 100a sends game inputs 162 to replay execution engine 156. In this manner, the user 100a interactively plays the portion of the video game in the play mode.

Figure 6A:
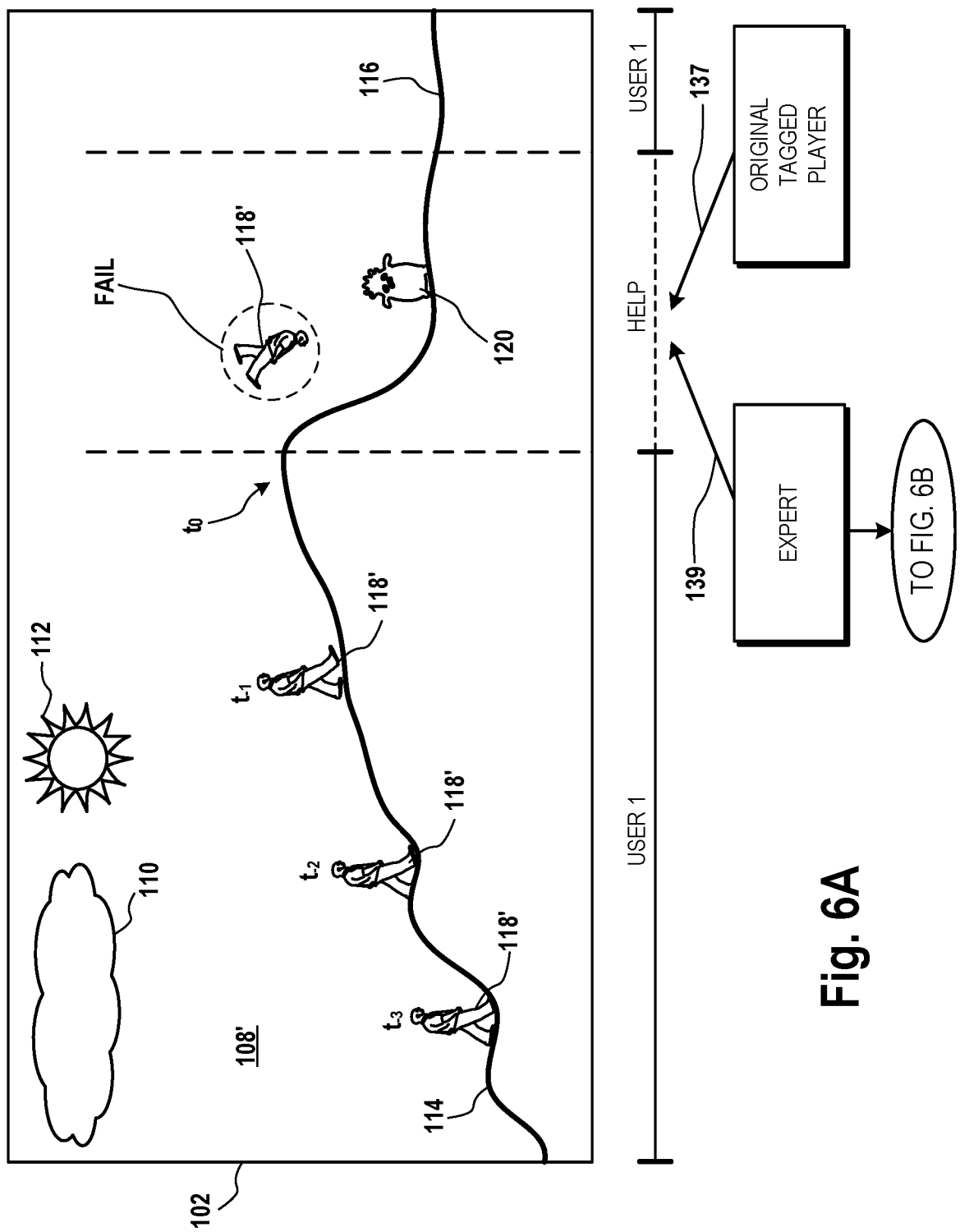
FIG. 6A illustrates additional details regarding the help options available through the help interface, which enables a user to request assistance with game play, in accordance with one embodiment.

FIG. 6A illustrates additional details regarding the help options available through the help interface, which enables a user to request assistance with game play, in accordance with one embodiment. As shown in FIG. 6A, a user, e.g., user 1, is playing a video game that is being displayed on screen 102. The video game being played by user 1 is the same video game shown in FIG. 1. As such, the scene 108' of the video game is the same as scene 108 shown in FIG. 1, with the exception that the game is being played by user 1 instead of player 106, who is a highly skilled player or a popular esports player. In particular, the scene 108' includes the same primary features shown in FIG. 1, namely cloud 110, sun 112, hill 114, and valley 116. The scene 108' also includes playing character 118', which is being controlled by user 1, and non-playing character (NPC) 120, which is a monster in the embodiments of FIGS. 1 and 6A. As set forth above in connection with the description of FIG. 1, to advance through scene 108', user 1 must first guide playing character 118' to the top of the hill 114 and then do a back flip from the top of the hill and land safely in the valley 116. The back flip should be executed so that the playing character 118' lands a safe distance beyond the NPC (monster) 120 and thereby avoids getting attacked by the monster. If the playing character 118' does not jump far enough to go past the monster 120 or does not land safely, the monster can attack the playing character. Unfortunately, user 1 lacks the ability to properly execute the back flip and, consequently, continually fails to get past the NPC (monster) 120. Thus, to advance through scene 108', user 1 might want to request assistance getting past NPC (monster) 120 through the help interface.

To request assistance with game play, e.g., when the user cannot keep up with the level of play required by the tagged game events, the user clicks on the help interface button 136 in user interface 130 (see FIG. 2). If the user wants to receive assistance from the tagged player (the player who was being watched when the spectator tagged the game event) during play of a portion of the video game in play mode, the user can request assistance with a game action by clicking on the tagged player button 137 in user interface 130 (see FIG. 2). In this embodiment, the previously recorded actions of the player will be substituted for the user during a segment of the portion of the video game being played in play mode. For example, in the case of the back flip in scene 108', the previously recorded actions of the player would be substituted for the user during the segment labeled "Help" in FIG. 6A. Once the player has completed the back flip using the state data generated when the player originally played the segment of the video game, the user will be substituted back for the player to complete the portion of the video game the user was playing in play mode.

If the user wants to receive assistance from an expert selected based on skill and expertise relative to a particular scene in a video game, after clicking on the help interface button 136 in user interface 130 (see FIG. 2), the user can request such expert assistance by clicking on the expert button 139 in user interface 130 (see FIG. 2). Additional details regarding the process of selecting the expert are set forth below with reference to FIG. 6B. In this embodiment, once the expert has been selected, the expert will be substituted for the user during a segment of the portion of the video game being played in play mode. For example, in the case of the back flip in scene 108', the expert would be substituted for the user during the segment labeled "Help" in FIG. 6A. Once the expert has completed the back flip using state data generated when the expert originally played the video game, the user will be substituted back for the expert to complete the portion of the video game the user was playing in play mode.

In the embodiments described above, the expert that is substituted for the user to play a part of the video game that is being played in play mode is a recording of the expert playing the video game, and this recording is combined with the state data generated when the expert previously played the video game. As noted above, the state data is captured and stored separately from the recording of the game play, e.g., as separate data from the recording of the game play. In another embodiment, the expert could be a live person. Upon receiving the request for assistance from the user, the live expert could take control of the video game and play the scene of the video game for which the user requested expert assistance. Once the live expert has completed playing the scene of the video game for which assistance was requested, the live expert would cede control of the video game back to the user.

Figure 6B:
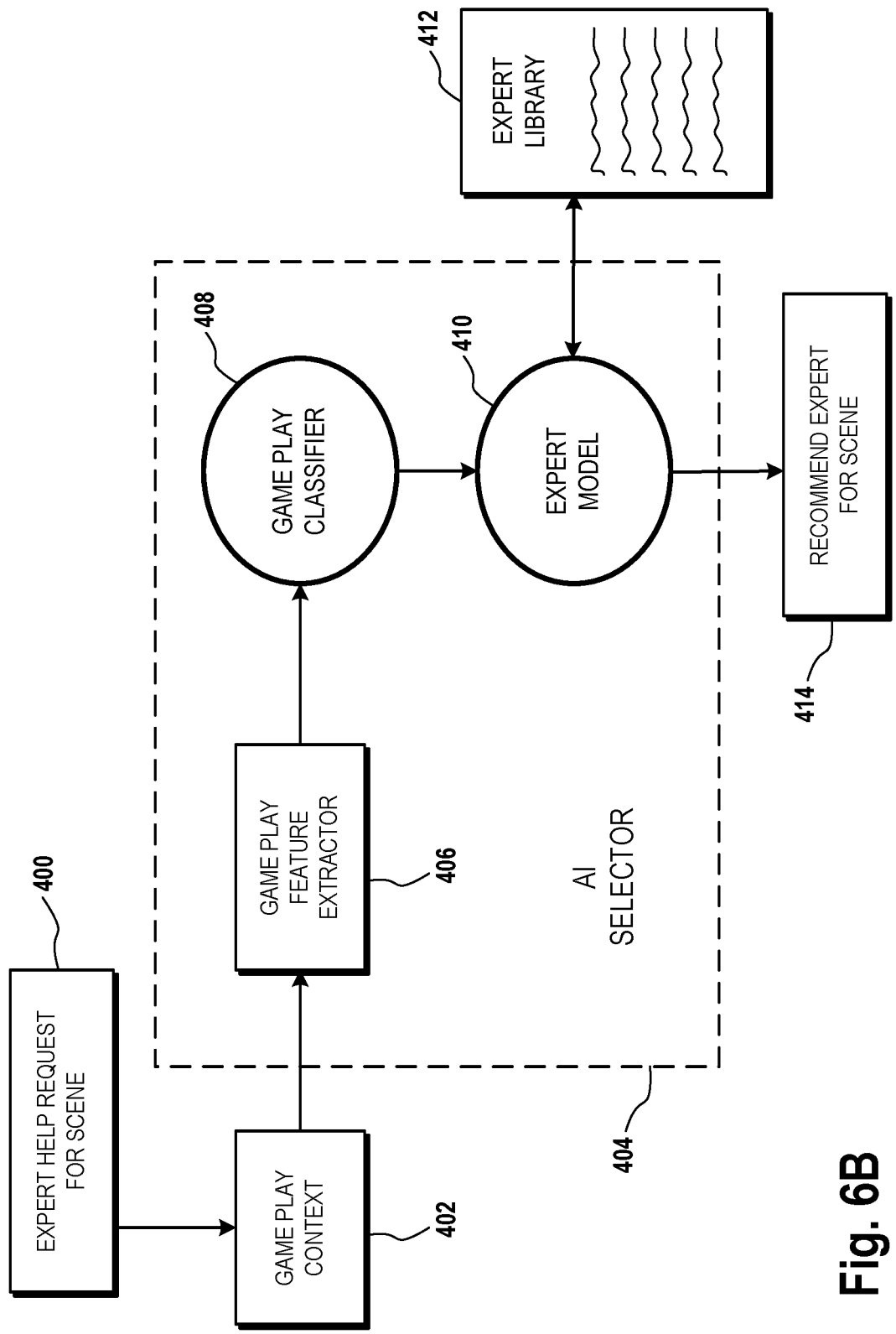
FIG. 6B is a simplified schematic diagram that illustrates additional details regarding the process of selecting an expert based on skill and expertise relative to a particular scene in a video game, in accordance with one embodiment.

FIG. 6B is a simplified schematic diagram that illustrates additional details regarding the process of selecting an expert based on skill and expertise relative to a particular scene in a video game, in accordance with one embodiment. As shown in FIG. 6B, expert help request 400 is a request received from a user for expert assistance with a game action in a scene of a video game. In one embodiment, the expert help request 400 is received during play of a portion of the video game in play mode. When the expert help request 400 is received, the game play context 402 associated with the expert help request is determined. In one embodiment, the game play context 402 is determined by an artificial intelligence (AI) selector 404, which includes game play feature extractor 406, game play classifier 408, and expert model 410. To determine the game play context 402, the game play feature extractor 406 extracts features of a scene of the video game in which the game action occurs, e.g., scene 108' shown in FIG. 6A, and game play classifier 408 processes the extracted features to generate classification data for the game action. The classification data generated by game play classifier 408 is then processed by expert model 410 to generate one or more expert recommendations for the game action. The processing by expert model 410 includes communicating with expert library 412, which has an inventory of video clips of previously tagged scenes in video games. If the processing involves a new tagged scene that is not already included in expert library 412, then the new tagged scene is added to the expert library 412. In this manner, the AI selector 404 learns new tagged scenes over the course of time. The recommended expert options 414 for the scene of the video game generated by the expert model 410 are presented to the user via a suitable user interface so that the user can make a selection. As set forth above in connection with the description of FIG. 6A, once the expert has been selected, the expert will be substituted for the user during a segment of the portion of the video game being played in play mode.

In another embodiment, in addition to either the tagged player or an expert taking control of the video game using previously recorded state data, the original video stream, including audio, of the tagged player/expert is also shown on the screen, e.g., in the lower right hand portion of the screen as shown in FIG. 1. Further, the experts can describe via audio how they managed to achieve success during a particular portion of the video game. Thus, in this embodiment, not only is the previously recorded state data for the tagged player/expert used, but also the original broadcast video feed published by the tagged player/expert is streamed. In the case of a spectator/user, a broadcast video feed could be streamed on an optional basis.

Figure 7:
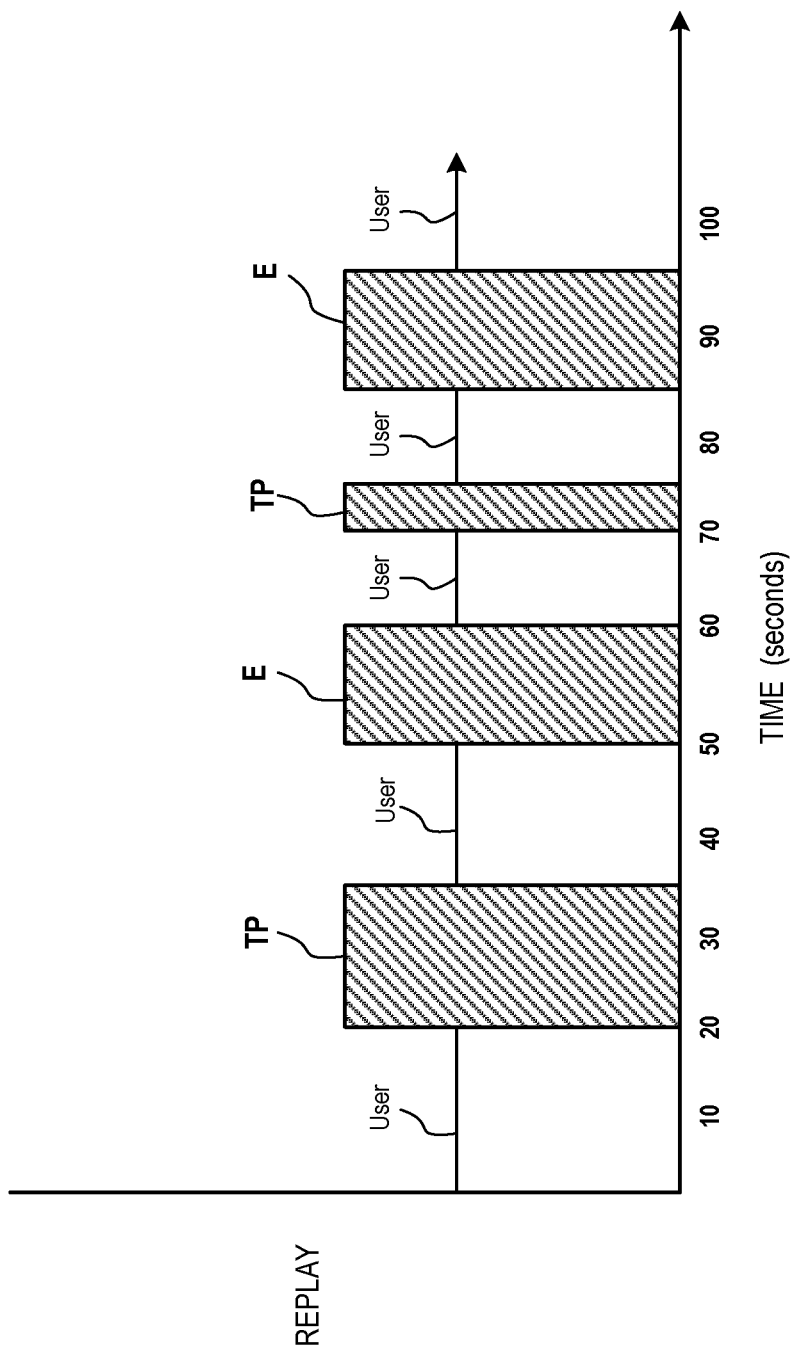
FIG. 7 is a graph that illustrates the use of an "auto play" feature to assist with game play during replay of a video game, in accordance with one embodiment.

FIG. 7 is a graph that illustrates the use of an "auto play" feature to assist with game play during replay of a video game, in accordance with one embodiment. In the embodiments described above, the user/spectator is playing a portion of a video game that includes a video clip associated with a tag selection in play mode. In other embodiments, the user is not limited to playing just the portion of the video game that includes the video clip associated with the tag selection. For example, in one embodiment, once the user has played the portion of the video game that includes the video clip associated with the tag selection, the user can be given the option to play the rest of the game from that point forward to see whether the user could have survived the rest of the game. In the event the user cannot keep up with the level of play required to survive the rest of the game, the user can receive game play assistance to advance past difficult game actions that the user does not currently have the ability to perform. As shown in FIG. 7, the user is replaying the video game in play mode up until the 20 second mark at which a difficult game action occurs. At this point, the tagged player (TP) is substituted for the user to perform the difficult game action. In one embodiment, either the tagged player (TP) or an expert (E) is automatically substituted for the user after either a certain number of game action failures, e.g., 3 failed attempts to perform the game action, or a certain amount of time has passed, e.g., 60 seconds, 120 seconds, etc., without being able to perform the game action. In another embodiment, the user can manually select to receive assistance from either the tagged player (TP) or an expert (E), as described above with reference to FIGS. 6A and 6B. At the 35 second mark, after the tagged player (TP) has performed the difficult game action, the user is substituted back for the tagged player (TP) so that the user can resume play of the game.

At the 50 second mark, the user encounters another difficult game action. This time an expert (E) is automatically substituted for the user to perform the difficult game action. In one embodiment, the expert (E) is substituted for the user instead of the tagged player (TP) because of the expert's skill and expertise associated with the difficult game action to be performed. At the 60 second mark, after the expert (E) has performed the difficult game action, the user is substituted back for the expert so that the user can resume play of the game. As shown in FIG. 7, two more substitutions occur as the user plays the video game. In particular, at the 70 second mark, the tagged player (TP) is substituted for the user to perform a difficult game action, and the user is substituted back for the tagged player at the 75 second mark. At the 85 second mark, an expert (E) is substituted for the user to perform another difficult game action, and the user is substituted back for the expert at the 95 second mark. In this manner, the user can experience playing the video game at a relatively high level even though the user may not have the skills or ability to keep up with level of play required by the game action.

In another example embodiment, a system for identifying game events is provided. The system, which has a server for executing games, includes a number of processors for carrying out the functionalities required for identifying game events as well as a storage system. The processors in the system include a spectator processor, a recording processor, a help processor, an expert processor, a watch mode processor, and a play mode processor. In one embodiment, these processors are general purpose computer chips, e.g., CPU's, which execute instructions stored in a memory. In another embodiment, these processors are specific purpose computer chips that include hardware designed to implement the requisite functionality of the particular processor.

The spectator processor provides a channel for a spectator to view a video game being played by a player. The spectator processor is configured to detect a tag selection in a scene of the video game while the video game is being played by the player. The spectator processor is further configured to identify a screen location that is associated with the tag selection and examine the screen location to identify a game action occurring proximate to the tag selection.

The recording processor is configured to access a recording of the video game that includes the game action. The recording includes a plurality of frames, and the plurality of frames is associated with state data generated when the video game was played by the player and metadata descriptive of progress of the video game by the player. The recording processor is further configured to examine the state data to quantify the recording and to assign a significance value to the recording, where the significance value is calculated from a combination of the state data and the metadata. The storage system stores a video clip from the recording associated with the tag selection when the significance value exceeds a predefined significance threshold. The video clip is made accessible for viewing in a watch mode and playable in a play mode, wherein the play mode uses the state data to execute a portion of the video game that relates to the video clip.

In one embodiment, the state data is configured to generate contextual features occurring in the scene and the metadata is configured to identify success features in the video game for the player, and the recording processor is configured to process the contextual features and the success features to generate classification data that is processed by a significance model, where the significance model is configured to produce the significance value for the recording.

The help processor is configured to provide assistance to a user with a game action. In particular, the help processor is configured to receive, during play of the portion of the video game in the play mode, a request from the user for assistance with a game action and substitute the player for the user during a segment of the portion of the video game being played in play mode. Upon completion of the segment, the help processor is configured to substitute back the user for the player to complete the portion of the video game being played in play mode.

The expert processor is configured to provide expert assistance to a user with a game action. In particular, the expert processor is configured to receive, during play of the portion of the video game in the play mode, a request from the user for expert assistance with a game action and determine a context for the game action by extracting features of a scene in which the game action occurs and processing the features with one or more classifiers to generate classification data for the game action. The expert processor is further configured to use an expert model to process the classification data for the game action and generate one or more expert recommendations for the game action. Still further, the expert processor is configured to cause the one or more expert recommendations to be displayed to the user and receive a selection of an expert from the one or more expert recommendations for the game action from the user. The expert processor is also configured to substitute the expert for the user during a segment of the portion of the video game being played in play mode so that the expert can execute the game action for the user. Upon completion of the segment by the expert, the expert processor is configured to substitute back the user for the expert so the user can resume playing the portion of the video game in the play mode.

The watch mode processor is configured to enable a user to view the video clip in the watch mode. In particular, the watch mode processor is configured to receive a request from the user to view the video clip in the watch mode and cause the video clip to be streamed to the user for viewing. The play mode processor is configured to enable a user to play the video clip in the play mode. In particular, the play mode processor is configured to receive a request from the user to play the video clip in the play mode and transmit game code and the state data to enable play of a portion of the video game that corresponds to the video clip in the play mode. A replay execution engine executes the game code using the state data, and the play mode processor is further configured to cause the portion of the video game to be streamed to the user so that the user can interactively play the portion of the video game in the play mode.

In the example embodiments described herein, spectators are enabled to tag game events so that the tagged game events can be experienced again at a later point in time, either by watching a replay or playing the tagged game events for themselves. In addition, if a spectator playing the video game (herein referred to as the "user" when playing the game) cannot keep up with the level of play required by the tagged game events, the user can request expert assistance playing the game. It will be apparent to those skilled in the art that the principles described herein are not restricted to these specific examples. For example, spectators can tag virtual objects for specific events, e.g., a spectator can tag a rock and write a comment such as "This rock is great to hide behind" or select an action/event associated with the virtual object. In addition, video games can use spectator tagged data for interesting game events or updates. In this manner, spectators have more interaction in video games even though they are not playing in the games.

In other embodiments, spectator tagged items or events can be used to flag bugs for a crowd-sourced post-launch quality assurance effort. As part of this effort, spectators would be allowed to tag items that either look wrong or behave incorrectly. The tagging of game events also can be used in connection with notifications regarding specific esports player events. For example, some spectators/users might be interested in receiving notifications when a highly skilled player, e.g., Ninja, gets defeated in a popular video game, e.g., Fortnite. The spectator/user would receive notification of the event along with a recorded video stream of the action around the event. The spectator/user also could be given the option to play the rest of the video game (onward from the point of the event) to see whether they could have survived the game (or otherwise done better in the game).

In yet other embodiments, a spectator/user can replay popular esports player moves for themselves. In addition, spectators can create collections of "cool" or otherwise interesting events for specific game points to be used by other players, e.g., for purposes of training, or by other spectators, e.g., for creating video stories, etc.

Figure 8:
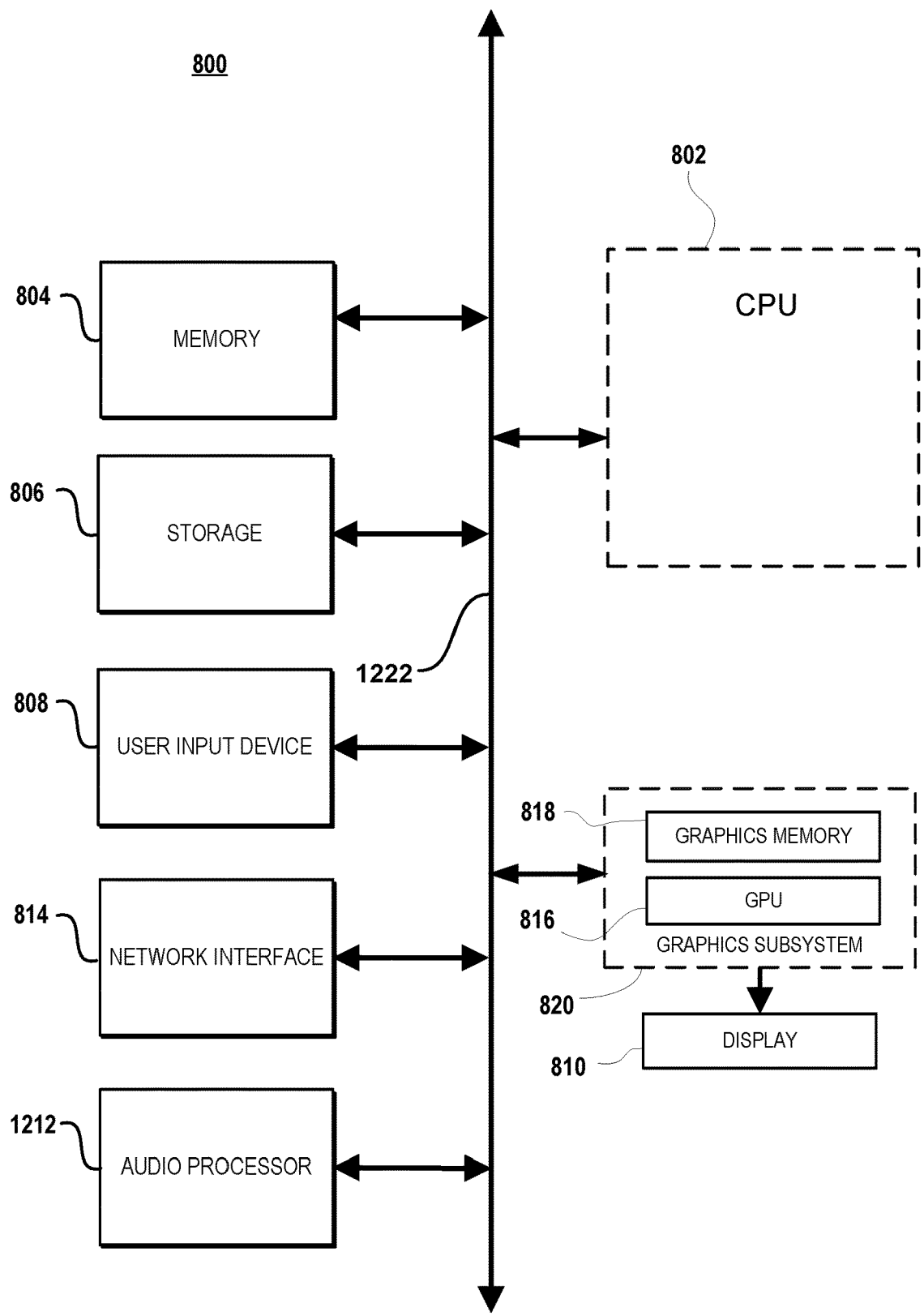
FIG. 8 illustrates components of an example device that can be used to perform aspects of the various embodiments of the present disclosure.

FIG. 8 illustrates components of an example device 800 that can be used to perform aspects of the various embodiments of the present disclosure. This block diagram illustrates a device 800 that can incorporate or can be a personal computer, video game console, personal digital assistant, a server or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be a localized to a player playing a game segment (e.g., game console), or remote from the player (e.g., back-end server processor), or one of many servers using virtualization in a game cloud system for remote streaming of gameplay to clients.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include video game controllers, keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 808, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810. Display device 810 can be any device capable of displaying visual information in response to a signal from the device 800, including CRT, LCD, plasma, and OLED displays. Device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for identifying game events, comprising:
   providing a channel for a spectator to view a video game being played by a player;
   detecting a tag selection in a scene of said video game while said video game is being played by said player;
   identifying a screen location that is associated with said tag selection;
   examining said screen location to identify a game action occurring proximate to said tag selection;
   accessing a recording of said video game that includes said game action, said recording includes a plurality of frames, and said plurality of frames is associated with state data generated when said video game was played by said player and metadata descriptive of progress of the video game by said player;
   examining said state data and said metadata to quantify said recording, the examining is configured to assign a significance value to said recording, said significance value is calculated from a combination of said state data and said metadata; and
   storing a video clip from said recording associated with said tag selection when said significance value exceeds a predefined significance threshold,
   wherein said video clip is made accessible for viewing in a watch mode and playable in a play mode, and wherein said play mode uses said state data to execute a portion of said video game that relates to said video clip.

2. The method of claim 1, wherein the screen location for the tag selection is used to exclude any game action with a weighting value below a weighting threshold.

3. The method of claim 1, wherein the state data is configured to generate contextual features occurring in the scene and the metadata is configured to identify success features in the video game for the player.

4. The method of claim 3, wherein the contextual features and the success features are processed by one or more classifiers to generate classification data that is processed by a significance model, said significance model is configured to produce the significance value for the recording.

5. The method of claim 4, wherein feedback is received from one or more viewers of the recording to determine an accuracy of the significance value of the recording.

6. The method of claim 5, wherein the viewers of the recording include one or more of a player, a spectator, and a game developer.

7. The method of claim 1, wherein the video clip includes a plurality of frames before the detecting of the tag selection and a plurality of frames after the detecting of the tag selection.

8. The method of claim 1, wherein a length of the video clip is based on the significance value of the recording such that a length of a video clip related to a relatively high significance value is greater than a length of a video clip related to a relatively low significance value.

9. The method of claim 1, wherein the examining of the screen location to identify a game action occurring proximate to the tag selection includes:
   defining a plurality of weighting regions around the screen location, each of said plurality of weighting regions having an assigned weighting value; and
   determining whether a game action is occurring within each of said plurality of weighting regions.

10. The method of claim 9, wherein the plurality of weighting regions includes a plurality of concentric circles, said plurality of concentric circles having the screen location as a common center.

11. The method of claim 1, further comprising:
    receiving a request from a user to view the video clip in the watch mode; and
    causing the video clip to be streamed to said user for viewing.

12. The method of claim 1, further comprising:
    receiving a request from a user to play the video clip in the play mode;
    transmitting game code and the state data to enable play of a portion of the video game that corresponds to the video clip in the play mode, wherein a play execution engine executes the game code using the state data; and
    causing said portion of the video game to be streamed to said user so that said user can interactively play said portion of the video game in the play mode.

13. The method of claim 12, further comprising:
    during play of the portion of the video game in the play mode, receiving a request from the user for assistance with a game action;
    substituting the player for the user during a segment of the portion of the video game being played in play mode; and
    upon completion of said segment, substituting back the user for the player to complete the portion of the video game being played in play mode.

14. The method of claim 13, further comprising:
    causing a previously published video feed of the player playing the segment of the portion of the video game being played in play mode to be streamed to the user for viewing, said previously published video feed of the player having been published when the player originally played the segment of the portion of the video game being played in play mode.

15. The method of claim 12, further comprising:
during play of the portion of the video game in the play mode, receiving a request from the user for expert assistance with a game action;
determining a context for said game action, the determining includes extracting features of a scene in which said game action occurs and processing said features with one or more classifiers to generate classification data for said game action;
using an expert model to process said classification data for said game action and generate one or more expert recommendations for said game action;
causing said one or more expert recommendations to be displayed to said user;
receiving a selection of an expert from said one or more expert recommendations for said game action from said user;
substituting said expert for the user during a segment of the portion of the video game being played in play mode so that said expert can execute said game action for the user; and
upon completion of said segment by said expert, substituting back the user for said expert so the user can resume playing the portion of the video game in the play mode.

16. The method of claim 15, further comprising:
causing a previously published video feed of the expert playing the segment of the portion of the video game being played in play mode to be streamed to the user for viewing, said previously published video feed of the expert having been published when the expert originally played the segment of the portion of the video game being played in play mode.

17. A system for identifying game events, the system including a server for executing games, the system comprising:
a spectator processor for providing a channel for a spectator to view a video game being played by a player, said spectator processor is configured to detect a tag selection in a scene of said video game while said video game is being played by said player, and said spectator processor is configured to identify a screen location that is associated with said tag selection and examine said screen location to identify a game action occurring proximate to said tag selection;
a recording processor configured to access a recording of the video game that includes said game action, said recording includes a plurality of frames, and said plurality of frames is associated with state data generated when said video game was played by said player and metadata descriptive of progress of said video game by said player, said recording processor is configured to examine said state data to quantify said recording and to assign a significance value to said recording, said significance value is calculated from a combination of said state data and said metadata; and
a storage system for storing a video clip from said recording associated with said tag selection when said significance value exceeds a predefined significance threshold, said video clip is made accessible for viewing in a watch mode and playable in a play mode, wherein said play mode uses said state data to execute a portion of said video game that relates to said video clip.

18. The system of claim 17, wherein the state data is configured to generate contextual features occurring in the scene and the metadata is configured to identify success features in the video game for the player, and the recording processor is configured to process the contextual features and the success features to generate classification data that is processed by a significance model, said significance model is configured to produce the significance value for the recording.

19. The system of claim 17, further comprising:
a help processor for providing assistance to a user with a game action, the help processor is configured to receive, during play of the portion of the video game in the play mode, a request from the user for assistance with a game action and substitute the player for the user during a segment of the portion of the video game being played in play mode, and, upon completion of said segment, the help processor is configured to substitute back the user for the player to complete the portion of the video game being played in play mode.

20. The system of claim 17, further comprising:
an expert processor for providing expert assistance to a user with a game action, the expert processor is configured to receive, during play of the portion of the video game in the play mode, a request from the user for expert assistance with a game action and determine a context for said game action by extracting features of a scene in which said game action occurs and processing said features with one or more classifiers to generate classification data for said game action, the expert processor is configured to use an expert model to process said classification data for said game action and generate one or more expert recommendations for said game action, the expert processor is configured to cause said one or more expert recommendations to be displayed to said user and receive a selection of an expert from said one or more expert recommendations for said game action from said user, and the expert processor is configured to substitute said expert for the user during a segment of the portion of the video game being played in play mode so that said expert can execute said game action for the user, and, upon completion of said segment by said expert, the expert processor is configured to substitute back the user for said expert so the user can resume playing the portion of the video game in the play mode.

21. The system of claim 17, further comprising:
a help processor for providing assistance to a user with a game action, the help processor is configured to receive, during play of the portion of the video game in the play mode, a request from the user for assistance with a game action and substitute the player for the user during a segment of the portion of the video game being played in play mode, and, upon completion of said segment, the help processor is configured to substitute back the user for the player to complete the portion of the video game being played in play mode; and
an expert processor for providing expert assistance to a user with a game action, the expert processor is configured to receive, during play of the portion of the video game in the play mode, a request from the user for expert assistance with a game action and determine a context for said game action by extracting features of a scene in which said game action occurs and processing said features with one or more classifiers to generate classification data for said game action, the expert processor is configured to use an expert model to process said classification data for said game action and generate one or more expert recommendations for said game action, the expert processor is configured to cause said one or more expert recommendations to be displayed to said user and receive a selection of an expert from said one or more expert recommendations for said game action from said user, and the expert processor is configured to substitute said expert for the user during a segment of the portion of the video game being played in play mode so that said expert can execute said game action for the user, and, upon completion of said segment by said expert, the expert processor is configured to substitute back the user for said expert so the user can resume playing the portion of the video game in the play mode.

22. The system of claim 17, further comprising:
a watch mode processor for enabling a user to view the video clip in the watch mode, said watch mode processor is configured to receive a request from said user to view the video clip in the watch mode and cause the video clip to be streamed to said user for viewing.

23. The system of claim 17, further comprising:
a play mode processor enabling a user to play the video clip in the play mode, said play mode processor is configured to receive a request from said user to play the video clip in the play mode and transmit game code and the state data to enable play of a portion of the video game that corresponds to the video clip in the play mode, wherein a play execution engine executes the game code using the state data, and the play mode processor is configured to cause said portion of the video game to be streamed to said user so that said user can interactively play said portion of the video game in the play mode.

24. A non-transitory computer readable medium containing program instructions for identifying game events, said non-transitory computer readable medium comprising:
program instructions for providing a channel for a spectator to view a video game being played by a player;
program instructions for detecting a tag selection in a scene of said video game while said video game is being played by said player;
program instructions for identifying a screen location that is associated with said tag selection;
program instructions for examining the screen location to identify a game action occurring proximate to said tag selection;
program instructions for accessing a recording of the video game that includes said game action, said recording includes a plurality of frames, and said plurality of frames is associated with state data generated when the video game was played by said player and metadata descriptive of progress of the video game by said player;
program instructions for examining said state data to quantify said recording, the examining is configured to assign a significance value to said recording, the significance value is calculated from a combination of said state data and said metadata; and
program instructions for storing a video clip from said recording associated with said tag selection when said significance value exceeds a predefined significance threshold,
wherein said video clip is made accessible for viewing in a watch mode and playable in a play mode, and wherein said play mode uses said state data to execute a portion of said video game that relates to said video clip.

* * * * *